March 31, 1931.  E. LAXO  1,799,106
AUTOMATIC STOP MECHANISM
Filed Sept. 7, 1927
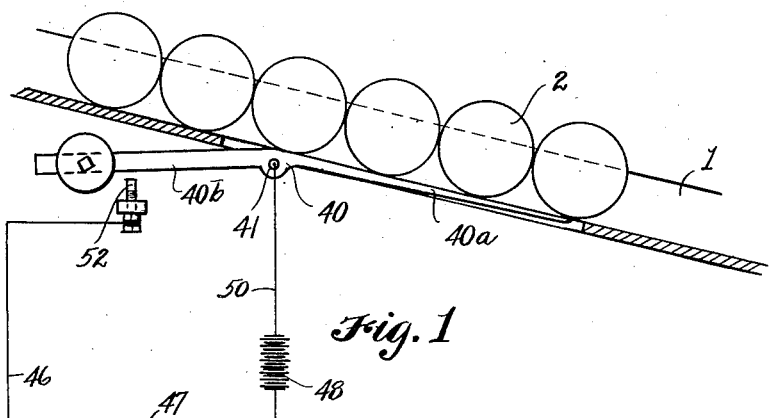
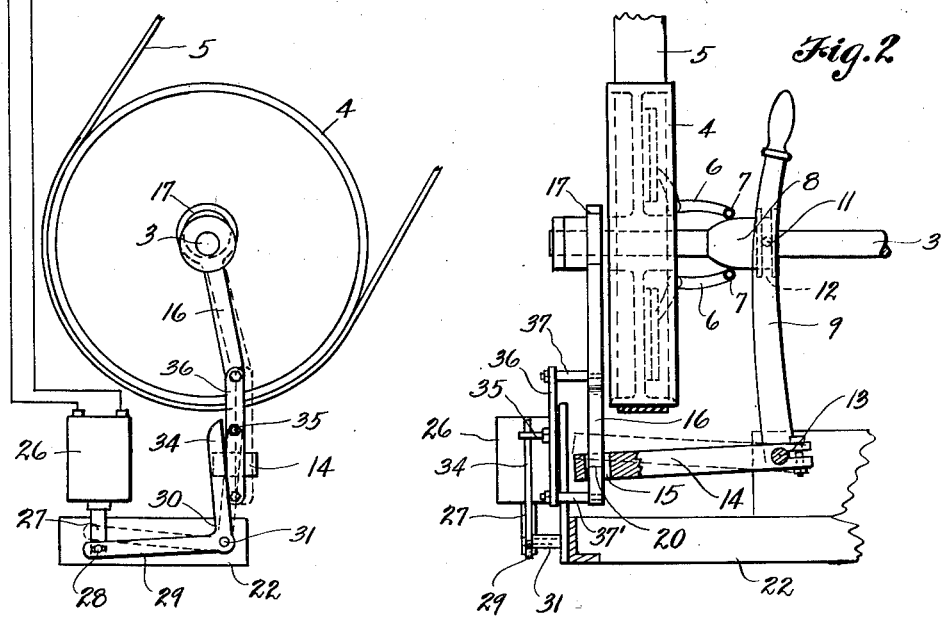
INVENTOR
ED. LAXO
BY
Cook & Robinson
ATTORNEY Patented Mar. 31, 1931

1,799,106

UNITED STATES PATENT OFFICE

ED LAXO, OF SEATTLE, WASHINGTON, ASSIGNOR, BY MESNE ASSIGNMENTS, TO CONTINENTAL CAN COMPANY, INC., OF NEW YORK, N. Y., A CORPORATION OF NEW YORK

AUTOMATIC STOP MECHANISM

Application filed September 7, 1927. Serial No. 217,988.

This invention relates to improvements in automatic stop mechanisms for power driven machines, and more particularly to a stop mechanism for use in connection with machines to which material to be operated on is delivered; it being the principal object of the invention to provide mechanism for stopping the machine in the event that the feeding of material thereto is interrupted, also, for starting the machine when the feeding of the material is again resumed.

More specifically stated, the object of this invention is to provide an automatic stop for use on can body flanging machines, or the like, that is controlled by the action of a solenoid to which an electric current is delivered under the control of a switch lever supported in a position to be engaged by can bodies delivered to the machine and to be held thereby in "open" position, but which will drop to "closed" position in the event that the supply of can bodies is exhausted or their delivery to the machine is, for any reason, stopped and will thereby cause the solenoid to be energized so that it will act through other mechanisms to shift the machine driving clutch to discontinue driving.

Other objects of the invention reside in the specific mechanisms whereby the clutch is shifted between off and on positions.

Still further objects reside in the various details of construction and in the combination of parts and in their mode of operation as is hereinafter described.

In accomplishing these objects, I have provided the improved details of construction, the preferred forms of which are illustrated in the accompanying drawings, wherein—

Figure 1 is a view showing diagrammatically and in elevation an automatic stopping and starting mechanism embodied by the present invention, with the electrical connections between the solenoid, source of electricity and switch contacts.

Figure 2 is a side elevation of the clutch shifting mechanism.

Figure 3 is a perspective view of parts of the mechanism.

Figure 4 is a detail view, illustrating the shifting of the clutch lever from "on" to "off" position.

Figure 5 is a similar view, showing the shifting of the clutch lever from "off" to "on" position.

Referring more in detail to the drawings—

1 designates an inclined chute along which cans or can bodies, as designated at 2, may be delivered to the machine with which the present stop mechanism is used. The machine, not herein illustrated, is equipped with a main driving shaft 3 on which there is mounted a pulley 4 over which a driving belt 5 operates. The pulley has no permanent, fixed relation to the shaft and may be continuously driven and the shaft 3 is to be driven only when a clutch device carried thereby is set.

The clutch device, which is not illustrated in detail, may be of any suitable type. As herein shown, it is equipped with setting and releasing levers 6—6 having rollers 7—7 at their ends that ride on the opposite sides of a clutch cone 8 that is longitudinally shiftable on the shaft 3. The clutch cone is adapted to be shifted on the shaft for the purpose of setting or releasing the clutch by the action of a shipper lever 9 that is operatively connected with the cone in any suitable manner, such as by means of a pin 11 extended therethrough and into an annular groove 12 in the cone.

The shipper lever is mounted at its lower end on a pivot shaft 13 and, fixed relative to the lever so as to move therewith, is a lever arm 14. This extends parallel with the shaft 3 to a position below the pulley 4 and it is provided, near its outer end, with a vertical opening 15 within which the lower end portion of a pitman rod 16 is slidably contained. At its upper end, the pitman has an eccentric mounting, as at 17, on the hub of the pulley wheel 4 so that, as the pulley rotates, the pitman is caused to reciprocate within the opening 15.

The lower end portion of the pitman rod is provided, at one side, with a downwardly facing, inwardly beveled shoulder 18 that is adapted to be engaged with an oppositely facing shoulder 19 provided on the lever arm 14 at one side of the opening 15, so that downward, reciprocal movement of the pitman may be caused to actuate the arm 14 downwardly to thereby shift the clutch mechanism from "off" to "on" position. Likewise, there is provided on the other side of the pitman rod an upwardly facing, inwardly beveled shoulder 20 adapted to be engaged with an oppositely facing shoulder 21 on the lever arm 14 at the adjacent side of the opening 15, so that upward reciprocal movement of the pitman may be caused to shift the lever arm 14 upwardly to move the clutch from "on" to "off" position.

In order to permit the lever arm 14 to remain at either set position regardless of reciprocal action of the pitman, the transverse width of the opening 15 is made sufficient that the pitman will have clearance therein and may be shifted from one side toward the other, so that after one of its shoulders has actuated the lever in one direction the other shoulder will not bring it right back. It will be noted, by reference to Figures 1, 4 and 5 of the drawing, that the lower end of the pitman is offset laterally from the vertical plane through the shaft 3. This arrangement provides that the tendency of the pitman to depend vertically from the shaft will automatically bring it into a position at which the shoulder 18 will, on downward, reciprocal movement of the pitman, engage the shoulder 19 to shift the lever arm 14 downwardly to thereby move the clutch from "off" to "on" position. By reason of the fact that there is a certain amount of clearance provided for operation of the pitman in the opening, the pitman will then reciprocate freely and no upward shifting action of the arm 14 will be effected until the pitman has been actuated laterally to the opposite side of the opening so that the shoulder 20 may be engaged with the shoulder 21 to pull the lever arm 14 upwardly.

The lateral shifting of the pitman from the position of Figure 4 to that of Figure 5, that is necessary to stop the machine, is effected by the action of a bell crank mechanism in connection with a solenoid, as will now be described. Supported forwardly of the pulley 4, by suitable supporting members as at 22, is a solenoid 26 having a downwardly extending armature, or core, 27 which, at its lower end, has operative connection, as at 28, with the horizontal arm 29 of a bell crank lever 30 that is supported by a pivot pin 31. The bell crank has a vertically directed lever arm 34 disposed so that it may be moved into a position for sliding engagement with a stud 35 that is fixed to a bar 36 which, in turn, is rigidly supported from and in parallel, spaced relation to the lower end portion of the pitman rod 16 by means of bolts 37—37' through its end portions. The lever arm 34 will, upon being engaged with the stud 35, shift the pitman laterally within the opening 15 of the lever arm 14 from the position of Figure 4 to that of Figure 5.

The means provided for controlling the action of the armature in the solenoid comprises a switch lever 40 that is pivotally supported intermediate its ends by means of a pivot pin 41, so that the end 40a of the lever underlies the chute 1 and engages with the cans 2 passing to the machine. The other end 40b of the lever is provided with a counter weight 45 which causes that end to swing downwardly when the other end is disengaged by the cans. One pole of the solenoid is connected, by means of a circuit wire 46, with an adjustable contact 52 disposed in a position to be engaged by the lever arm 40b when the latter swings downwardly, and the other pole is connected, by means of a wire 47, with one side of a source of electricity 48 which has its other side connected, by means of a wire 50, with the pivot 41 which supports the lever 40.

Assuming that the parts are so constructed and assembled with the machine as shown, operation would be as follows: During normal operation of the machine, the pulley wheel 4 rotates continuously and the pitman rod reciprocates freely through the opening 15 in the clutch shifting lever arm 14; the arm then being in the full line position of Figure 2, and the bell crank arm 34 is free of the stud 35 which allows the pitman to reciprocate between the positions shown in full and dotted lines in Figure 4. Now, assuming that the supply of cans in the chute becomes exhausted, the lever arm 40a will swing upwardly and the arm 40b will swing downwardly into engagement with the contact 52 to close a circuit through the solenoid, whereby the armature 27 will be drawn upwardly and the bell crank 30 actuated so that the arm 34 will be brought into contact with the stud 35 and the pitman will be shifted laterally to the position of Figure 5 so that the upwardly facing shoulder 20, at its lower end, will engage with the shoulder 21 of the lever 14 and the latter, on upward movement of the pitman, will be pulled upwardly and the clutch will thereby be shifted from "on" to "off" position.

With the delivery of cans again along the chute the lever 40 will be rocked to a position at which it will be disengaged from the contact 52 and the circuit to the solenoid will be opened so that the armature 27 will drop downwardly, thereby shifting the bell crank to a position at which it is released from the stud 35 and the pitman allowed to swing into position at which the shoulder 18 will, on downward movement of the pitman, engage the shoulder 19 to shift the lever arm 14 downwardly to move the clutch from "off" to "on" position and the machine set in motion.

While I have described the mechanism as used in connection with a cam making machine, it is readily apparent that it is suitable for various types of machines to and from which materials are delivered.

Having thus described my invention, what I claim as new therein and desire to secure by Letters-Patent, is:

1. The combination with a driven element, a machine driving element and a clutch providing a driving connection between them, of a clutch control mechanism including a pitman that is reciprocally actuated by the driven element and adapted to be positioned to release or set the clutch.

2. In a machine of the character described, the combination with a continuously operating element, a machine driving element and a clutch that is shiftable to make or release operative connection between said elements, of a control mechanism comprising a clutch shifting member, a pitman continuously reciprocally actuated by the first mentioned element and adapted to be engaged with the clutch shifting member to move the clutch from "on" to "off" position or from "off" to "on" position.

3. In a machine of the character described, the combination with a continuously driven element, a machine driving element and a clutch device that is shiftable to make or release driving connection between said elements, of a control mechanism comprising a clutch shifting lever, a pitman continuously reciprocally actuated by the continuously driven element and adapted to be engaged, under the control of articles delivered to the machine, with the clutch shifting lever to move the clutch from "on" to "off" position, or from "off" to "on" position.

4. In a machine of the character described, the combination with a rotatably driven element, a machine driving element and a clutch device that is shiftable to make or release driving connection between said elements, of a control mechanism comprising a clutch shifting lever, a pitman reciprocally actuated by the rotatably driven element and provided with oppositely facing shoulders adapted to be selectively engaged with the clutch shifting lever during reciprocal action of the pitman to move the clutch between "on" and "off" positions.

5. In a machine of the character described, the combination with a rotatably driven element, a machine driving element and a clutch device that is shiftable to make or release driving connection between said elements, of a control mechanism comprising a clutch shifting lever, a pitman reciprocally actuated by connection with the rotatably driven element and having oppositely facing shoulders thereon which, respectively, are adapted for engagement with the clutch shifting lever to actuate it to move the clutch to "on" and "off" positions and means operable under control of articles delivered to the machine for positioning the pitman for shifting the clutch from "on" to "off" position or vice versa.

6. In a machine of the character described, the combination with a driven element, a machine driving element and a clutch device that is shiftable to make or release driving connection between said elements, of a control mechanism comprising a clutch shifting member provided with an opening therethrough, a pitman reciprocally actuated by the driven element and extended through the opening of the lever and having oppositely facing shoulders thereon adapted to be selectively engaged with the lever to move the clutch between "on" and "off" positions.

7. In a machine of the character described, the combination with a rotatably driven element, a machine driving element and a clutch mechanism that is shiftable to make or release driving connection between said elements, of a control mechanism comprising a clutch shifting lever having an opening therethrough, a pitman extending through said opening and adapted to be reciprocally actuated by connection with the rotatably driven element, and having oppositely facing shoulders thereon for engaging opposite sides of the lever to shift it in opposite directions and means operable under the control of articles delivered to the machine for positioning the pitman to cause one or the other of said shoulders to engage with the lever.

8. In a machine of the character described, the combination with a rotatably driven element, a machine driving element and a clutch mechanism that is shiftable to make or release driving connection between said elements, of a control mechanism comprising a clutch shifting lever having an opening therein, a pitman extending through said opening and adapted to be reciprocally actuated by connection with the rotatably driven element and having oppositely facing shoulders thereon selectively engageable with opposite sides of the lever to shift it in opposite directions to move the clutch between "on" and "off" positions, an electrically controlled means for adjusting the position of the pitman for actuation of the clutch lever, an electric circuit for the said means and a circuit control member adapted to be actuated under control of articles delivered to the machine.

9. In a machine of the character described, the combination with a machine driving shaft, a pulley revoluble thereon and a clutch device that is shiftable to make or release driving connection between the pulley and shaft, of a control mechanism comprising a clutch shifting lever, having an opening therethrough, a pitman having an eccentric connection with the pulley and reciprocally contained within the said lever opening and shiftable laterally therein as it reciprocates and having oppositely facing shoulders on its opposite sides selectively engageable, by lateral shifting, with the lever to cause it to be moved in opposite directions for setting or releasing the clutch and means operable incident to a discontinuance of the feeding of material to the machine for shifting the pitman to cause it to release the clutch and by a resumption of the feeding of material, to the machine, cause it to set the clutch.

10. In a machine of the character described, the combination with a machine driving shaft, a pulley revoluble thereon and a clutch device that is shiftable to make or release driving connection between the pulley and shaft of a control mechanism comprising a clutch shifting lever having an opening therethrough, a pitman having an eccentric connection with the pulley and reciprocally contained within the said lever opening and shiftable laterally therein as it reciprocates and having oppositely facing shoulders on its opposite sides selectively engageable, by lateral shifting, with the lever to cause it to be moved in opposite directions for setting or releasing the clutch, a solenoid, an electric circuit therefor, an armature movable by the solenoid and adapted to control the lateral shifting of the pitman in the lever opening and a circuit control member operable under the control of articles delivered to the machine to open or close the circuit.

11. In a machine of the character described, the combination with a machine driving shaft, a pulley revoluble thereon and a clutch device that is shiftable to make or release driving connection between the pulley and shaft, of a control mechanism comprising a clutch shifting lever having an opening therethrough, a pitman having an eccentric connection with the pulley and reciprocally contained within the said opening and shiftable laterally therein as it reciprocates and having oppositely facing shoulders on its opposite sides selectively engageable by lateral shifting with the lever to cause the latter to be moved for setting or releasing the clutch, a stud supported from the pitman, a solenoid and electric circuit for the solenoid, an armature movable by the solenoid, a bell crank operatively connected with the armature and having a lever adapted for engagement with the pitman stud for shifting the pitman laterally and a circuit control member operable under the control of articles delivered to the machine for opening or closing the circuit.

12. In a machine of the character described, the combination with a driving shaft, a driven pulley on the shaft and a clutch device that is shiftable to make or release driving connection between the shaft and pulley, of a control mechanism comprising a clutch shifting lever provided with an opening therethrough that is offset from the vertical plane of the shaft, a pitman adapted to be reciprocally actuated by connection with the pulley and extending reciprocally through said opening of the clutch shifting lever and having oppositely facing shoulders formed on its opposite sides adapted to engage with opposite faces of the lever to shift it between "on" and "off" positions; the pitman being adapted to swing by gravity so that one of its shoulders will engage the lever to move the clutch from "off" to "on" position and means under the control of articles delivered to the machine for shifting the pitman to cause the other of said shoulders to engage the lever to move the clutch from "on" to "off" position.

Signed at Seattle, King County, Washington, this 5th day of August, 1927.

ED LAXO.